(12) United States Patent
Oh et al.

(10) Patent No.: US 10,649,282 B2
(45) Date of Patent: May 12, 2020

(54) DISPLAY DEVICE

(71) Applicant: Samsung Display Co., Ltd., Yongin-si, Gyeonggi-do (KR)

(72) Inventors: Keunchan Oh, Hwaseong-si (KR); Sun-kyu Joo, Suwon-si (KR); Donghan Song, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 189 days.

(21) Appl. No.: 15/867,936

(22) Filed: Jan. 11, 2018

(65) Prior Publication Data

US 2018/0356666 A1    Dec. 13, 2018

(30) Foreign Application Priority Data

Jun. 12, 2017 (KR) .......................... 10-2017-0073408

(51) Int. Cl.
| | | |
|---|---|---|
| *G02F 1/1339* | (2006.01) | |
| *G02F 1/1343* | (2006.01) | |
| *G02F 1/1368* | (2006.01) | |
| *G02F 1/1333* | (2006.01) | |
| *G02F 1/1362* | (2006.01) | |
| *G02F 1/1337* | (2006.01) | |
| *G02F 1/1335* | (2006.01) | |

(52) U.S. Cl.
CPC ........ *G02F 1/13394* (2013.01); *G02F 1/1337* (2013.01); *G02F 1/1368* (2013.01); *G02F 1/133345* (2013.01); *G02F 1/133512* (2013.01); *G02F 1/134309* (2013.01); *G02F 1/136286* (2013.01); *G02F 2001/13398* (2013.01); *G02F 2001/136222* (2013.01); *G02F 2201/121* (2013.01); *G02F 2201/123* (2013.01)

(58) Field of Classification Search
None
See application file for complete search history.

(56) References Cited

U.S. PATENT DOCUMENTS

| | | | |
|---|---|---|---|
| 9,733,509 B2 | 8/2017 | Yu | |
| 2005/0140892 A1* | 6/2005 | Kim ................. | G02F 1/133707 349/139 |

(Continued)

FOREIGN PATENT DOCUMENTS

| | | |
|---|---|---|
| KR | 10-0736629 | 7/2007 |
| KR | 10-2014-0119912 | 10/2014 |

(Continued)

*Primary Examiner* — Ryan Crockett
(74) *Attorney, Agent, or Firm* — Innovation Counsel LLP

(57) ABSTRACT

A display device includes a plurality of color filters that is disposed on a first base substrate and in pixel regions arranged in a matrix shape, a plurality of driving electrodes that is disposed on the color filters, a plurality of transistors that is provided on the first base substrate and in a non-pixel region between adjacent pixel regions in a second direction and is connected to the driving electrodes, a plurality of blocking column spacers that is provided below a second base substrate and in the non-pixel region between the adjacent pixel regions in the second direction and extending in a first direction, and a plurality of dummy color filters that is provided in a single-layered structure on the transistors. The dummy color filters that has a less number than that of the transistors support the blocking column spacers.

18 Claims, 12 Drawing Sheets

(56) References Cited

U.S. PATENT DOCUMENTS

| | | | |
|---|---|---|---|
| 2008/0068537 A1* | 3/2008 | Lee | G02F 1/136209 349/106 |
| 2009/0015780 A1* | 1/2009 | Choi | G02F 1/13394 349/156 |
| 2010/0156827 A1* | 6/2010 | Joo | G02F 1/13338 345/173 |
| 2012/0099042 A1* | 4/2012 | Lee | G02F 1/13392 349/43 |
| 2014/0022478 A1* | 1/2014 | Kim | G02F 1/1339 349/43 |
| 2015/0370116 A1* | 12/2015 | Chae | G02F 1/13394 349/43 |
| 2015/0378194 A1 | 12/2015 | Park et al. | |
| 2019/0227365 A1* | 7/2019 | Park | G02F 1/133345 |

FOREIGN PATENT DOCUMENTS

| | | |
|---|---|---|
| KR | 10-2015-0059026 | 5/2015 |
| KR | 10-1552902 | 9/2015 |
| KR | 10-2016-0001794 | 1/2016 |

* cited by examiner

DISPLAY DEVICE

CROSS-REFERENCE TO RELATED APPLICATIONS

This U.S. non-provisional patent application claims priority under 35 U.S.C. § 119 to Korean Patent Application No. 10-2017-0073408, filed on Jun. 12, 2017, in the Korean Intellectual Property Office, the disclosure of which is hereby incorporated by reference in its entirety.

BACKGROUND OF THE INVENTION

The present disclosure relates to a display device, and in particular, to a display device including dummy color filters.

In general, a display device includes a first substrate including a plurality of pixels, a second substrate facing the first substrate, and an image display layer interposed between the first substrate and the second substrate. Various image display layers, such as a liquid crystal layer, an electrowetting layer, and an electrophoresis layer, may be used as the image display layer.

Each of the pixels includes a pixel electrode that is connected to a thin-film transistor and a common electrode that is provided to face the pixel electrode. An electric field is produced by a data voltage applied to the pixel electrode and a common voltage applied to the common electrode to display an image on the display device.

To maintain a cell gap between the first and second substrates, column spacers are provided on the second substrate. The column spacers include a plurality of main column spacers and a plurality of sub column spacers. The main column spacers are formed to have a larger size than the sub column spacers in a vertical direction, thereby supporting the first substrate and the second substrate.

SUMMARY

Some embodiments of the inventive concept provide a display device that can be fabricated with improved fabrication convenience and a reduced fabrication cost.

According to some embodiments of the inventive concept, a display device may include a first base substrate including a plurality of pixel regions that is arranged to form a plurality of rows and a plurality of columns, and a non-pixel region that is disposed adjacent to each of the pixel regions, the rows being parallel to a first direction and the columns being parallel to a second direction crossing the first direction, a second base substrate facing the first base substrate, a liquid crystal layer disposed between the first base substrate and the second base substrate, a plurality of color filters disposed on the first base substrate in the plurality of pixel regions, a plurality of driving electrodes disposed on the plurality of color filters, a plurality of transistors disposed on the first base substrate in the non-pixel region between adjacent pixel regions in the second direction and connected to the plurality of driving electrodes, respectively, a plurality of blocking column spacers disposed below the second base substrate and extending in the first direction in the non-pixel region between the adjacent pixel regions in the second direction, and a plurality of dummy color filters that is disposed in a single-layered structure on predetermined ones of the plurality of transistors, and a number of the plurality of dummy color filters is less than a number of the plurality of transistors. The plurality of dummy color filters may support the plurality of blocking column spacers.

According to some embodiments of the inventive concept, a display device may include a first base substrate including a plurality of pixel regions that is arranged to form a plurality of rows and a plurality of columns, and a non-pixel region that is disposed adjacent to each of the pixel regions, the rows being parallel to a first direction and the columns being parallel to a second direction crossing the first direction, a second base substrate facing the first base substrate, a liquid crystal layer disposed between the first base substrate and the second base substrate, a plurality of color filters disposed on the first base substrate in the plurality of pixel regions, a plurality of driving electrodes disposed on the plurality of color filters, a plurality of transistors disposed on the first base substrate in the non-pixel region between the adjacent pixel regions in the second direction and connected to the plurality of driving electrodes, respectively, a plurality of blocking column spacers disposed below the second base substrate and extending in the first direction in the non-pixel region between the adjacent pixel regions in the second direction, and a plurality of dummy color filters extending in the first direction overlapping the plurality of blocking column spacers and disposed on the first base substrate to cover the plurality of transistors. Some of the plurality of dummy color filters disposed on the plurality of transistors may support the blocking column spacers.

According to some embodiments of the inventive concept, a display device may include a first base substrate including a plurality of pixel regions that is arranged to form a plurality of rows and a plurality of columns, and a non-pixel region that is disposed near each of the pixel regions, the rows being parallel to a first direction and the columns being parallel to a second direction crossing the first direction, a second base substrate facing the first base substrate, a liquid crystal layer disposed between the first base substrate and the second base substrate, a plurality of color filters disposed on the first base substrate in the plurality of pixel regions, a plurality of driving electrodes disposed on the plurality of color filters, a plurality of transistors disposed on the first base substrate in the non-pixel region between adjacent pixel regions in the second direction and connected to the plurality of driving electrodes, respectively, a plurality of main column spacers disposed below the second base substrate and overlapping a predetermined number of ones of the plurality of transistors, a plurality of sub column spacers disposed adjacent to the plurality of main column spacers, and a plurality of dummy color filters disposed on the non-pixel region of the first base substrate that is positioned between the adjacent pixel regions in the second direction, the plurality of dummy color filters extending in the first direction and covering the plurality of transistors. Ones of the dummy color filters that is disposed on the predetermined number of one of the plurality of transistors may be used to support the plurality of main column spacers.

BRIEF DESCRIPTION OF THE DRAWINGS

Example embodiments will be more clearly understood from the following detailed description taken in conjunction with the accompanying drawings. The accompanying drawings represent non-limiting, example embodiments as described herein.

Figure 1:
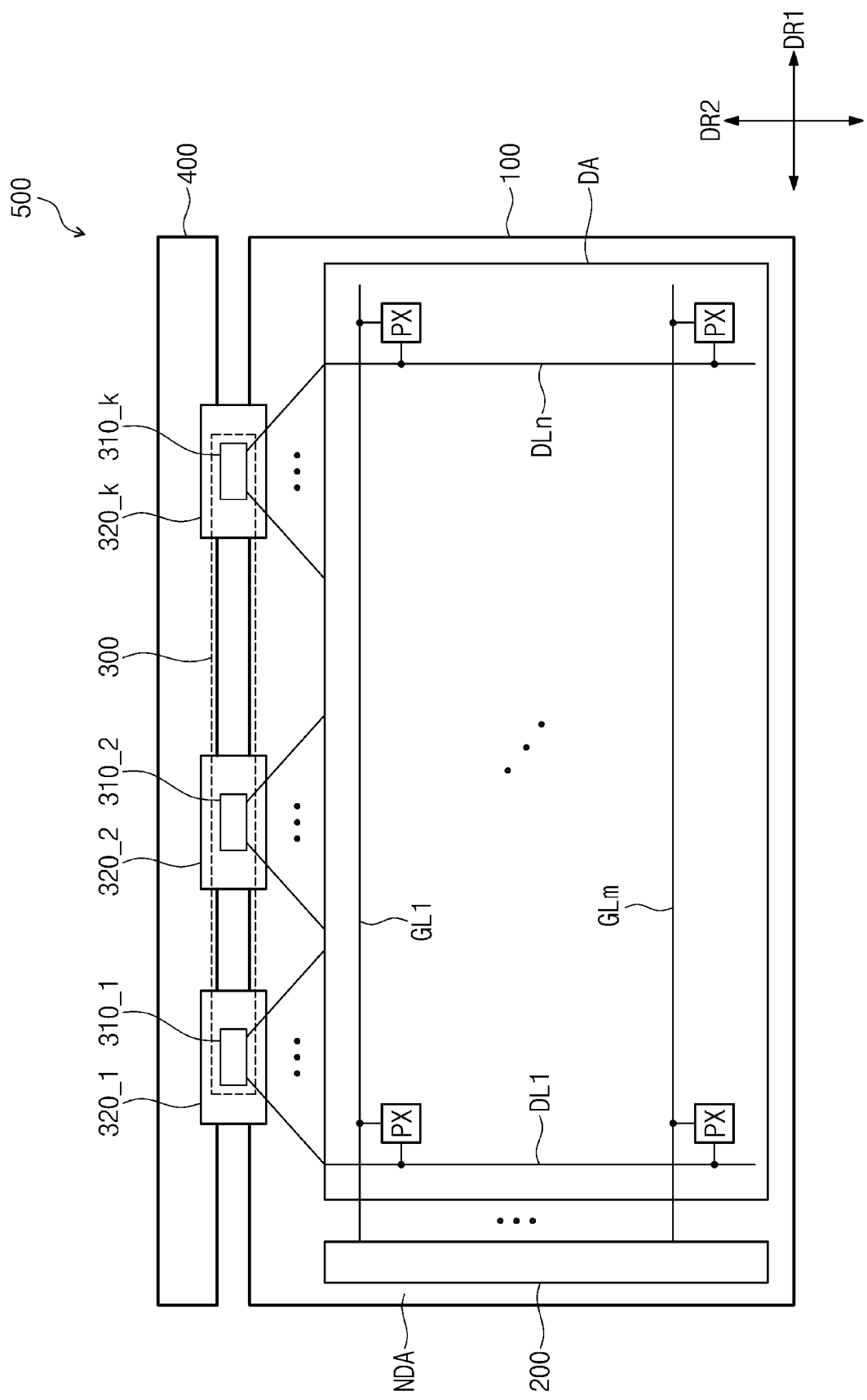
FIG. 1 is a plan view illustrating a display device according to some embodiments of the inventive concept.

It should be noted that these figures are intended to illustrate the general characteristics of methods, structure, and/or materials utilized in certain example embodiments and to supplement the written description provided below. These drawings are not, however, to scale and may not reflect the precise structural or performance characteristics of any given embodiment, and should not be interpreted as defining or limiting a range of values or properties encompassed by example embodiments. For example, the relative thicknesses and positioning of molecules, layers, regions, and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and sizes and should not be construed as being limited to the embodiments set forth herein; rather, these embodiments are provided so that the present disclosure will be thorough and complete, and will fully convey the inventive concept of example embodiments to those of ordinary skill in the art. In the drawings, the thicknesses of layers and regions may be reduced or exaggerated for clarity. Like reference numerals in the drawings may denote like elements, and repeating description may be omitted.

It will be understood that when an element is referred to as being "connected" or "coupled" to another element, it can be directly connected or coupled to the other element or one or more intervening elements may be present. In contrast, when an element is referred to as being "directly connected" or "directly coupled" to another element, there may be no intervening elements present. Like numbers indicate like elements throughout the present disclosure. As used herein the term "and/or" includes any and all combinations of one or more of the associated listed items. Other words used to describe the relationship between elements or layers should be interpreted in a similar fashion (e.g., "between" versus "directly between," "adjacent" versus "directly adjacent," "on" versus "directly on").

It will be understood that, although the terms "first", "second", etc. may be used herein to describe various elements, components, regions, layers, and/or sections, these elements, components, regions, layers, and/or sections should not be limited by these terms. Instead, these terms are used to distinguish one element, component, region, layer, or section from another element, component, region, layer, or section. Thus, a first element, component, region, layer, or section discussed below could be termed a second element, component, region, layer, or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations), and the spatially relative descriptors used herein interpreted accordingly.

The terminology used herein is for the purpose of describing particular embodiments only and is not intended to be limiting of example embodiments. As used herein, the singular forms "a," "an" and "the" are intended to include plural forms as well, unless the context clearly indicates otherwise. It will be further understood that the terms "comprises", "comprising", "includes" and/or "including," used herein, specify the presence of stated features, integers, steps, operations, elements, components, and/or groups, but do not preclude the presence or addition of one or more other features, integers, steps, operations, elements, components, and/or groups thereof.

Example embodiments of the inventive concepts are described herein with reference to one or more cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that may result, for example, from manufacturing techniques and/or tolerances. Thus, the regions illustrated in the figures are schematic in nature, and their shapes are not intended to illustrate an actual shape of a region of a device and are not intended to limit the scope of example embodiments.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
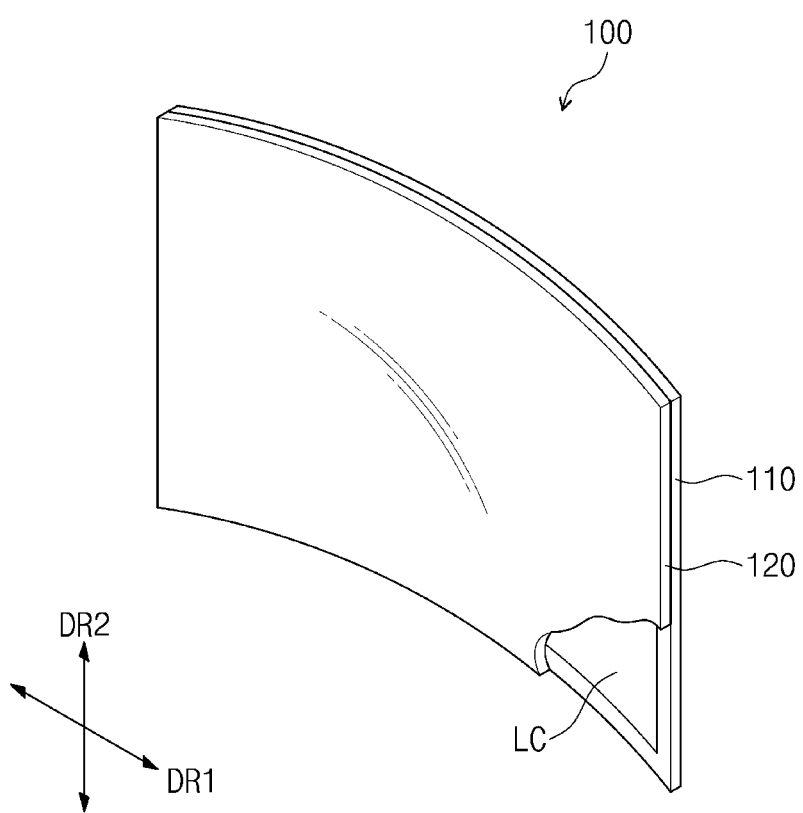
FIG. 2 is a diagram illustrating a curved display panel that is provided as an example of the display panel shown in FIG. 1.

FIG. 1 is a plan view illustrating a display device according to some embodiments of the inventive concept. FIG. 2 is a diagram illustrating a curved display panel that is provided as an example of the display panel shown in FIG. 1.

Referring to FIGS. 1 and 2, a display device 500 according to some embodiments of the inventive concept may include a display panel 100, a gate driver 200, a data driver 300, and a driving circuit substrate 400. The display panel 100 may be a liquid crystal display panel including a first substrate 110, a second substrate 120 facing the first substrate 110, and a liquid crystal layer LC disposed between the first substrate 110 and the second substrate 120.

The display panel 100 may have a rectangular shape having long sides extending in a first direction DR1 and short sides extending in a second direction DR2 that crosses the first direction DR1. The display panel 100 may be a curved display panel that is curved about an axis extending in the second direction DR2. For example, the first substrate 110 and the second substrate 120 may be curved by bonding the first substrate 110 and the second substrate 120 to each other and then exerting a force to curve the bonded substrates about the axis extending in the second direction DR2. However, the inventive concept is not limited thereto, and the display panel 100 may have a flat shape without being curved, or the display panel 100 may be curved about different axes, for example, an axis extending in the first direction DR1 or axes extending both the first direction DR1 and the second direction DR2.

The display panel 100 may include a plurality of gate lines GL1-GLm, a plurality of data lines DL1-DLn, and a plurality of pixels PX. Here, m and n are integers greater than 0. The gate lines GL1-GLm and the data lines DL1-DLn may be electrically insulated from each other and may be disposed to cross each other. The gate lines GL1-GLm may extend in the first direction DR1 and may be connected to the gate driver 200. The data lines DL1-DLn may extend in the second direction DR2 and may be connected to the data driver 300.

When viewed in a plan view, the display panel 100 may include a display region DA that is configured to display an image, and a non-display region NDA that is disposed to surround the display region DA and is not used to display the image. The pixels PX may be arranged to form a plurality of rows parallel to the first direction DR1 and a plurality of columns parallel to the second direction DR2, thereby forming a matrix-shaped arrangement in the display region DA. The pixels PX may be disposed in respective areas in the display region DA that are divided by the gate lines GL1-GLm and the data lines DL1-DLn crossing each other. The pixels PX may be arranged to form m rows and n columns.

Each of the pixels PX may be connected to a corresponding one of the gate lines GL1-GLm and one of the data lines DL1-DLn. Each of the pixels PX may be configured to display one of primary colors. The primary colors may include red, green, blue, and white colors. However, the inventive concept is not limited thereto, and the primary colors may include other colors, such as yellow, cyan, and magenta.

The gate driver 200 may be disposed in the non-display region NDA that is located between one of the short sides of the display panel 100 and the display region DA. The gate driver 200 and transistors of the pixels PX may be formed using the same process. In one embodiment, the gate driver 200 may be provided in the form of an amorphous silicon thin film transistor (TFT) gate (ASG) or oxide silicon TFT gate (OSG) driver circuit mounted on the display panel 100.

However, the inventive concept is not limited thereto, and the gate driver 200 may be provided in the form of a plurality of driving chips and may be mounted on a flexible printed circuit board (FPCB) to be connected to the display panel 100 in a tape carrier package (TCP) manner. In addition, the gate driver 200 may be provided in the form of a plurality of driving chips and may be mounted on the display panel 100 in a chip-on-glass (COG) manner.

The gate driver 200 may receive a gate control signal from a timing controller (not shown) that is mounted on the driving circuit substrate 400. Although not shown, the timing controller may be provided in the form of an integrated circuit chip that is mounted on the driving circuit substrate 400, and may be connected to the gate driver 200 and the data driver 300.

The gate driver 200 may be configured to generate a plurality of gate signals in response to the gate control signal received from the timing controller. The gate driver 200 may output the gate signals sequentially. The gate signals may be provided to the pixels PX through the gate lines GL1-GLm on a row-by-row basis. Accordingly, the pixels PX may be driven on the row-by-row basis.

The data driver 300 may include a plurality of source driving chips 310_1-310_k. The source driving chips 310_1-310_k may be mounted on flexible circuit substrates 320_1-320_k, respectively, and may be connected to the non-display region NDA that is adjacent to the driving circuit substrate 400 and one of the long sides of the display panel 100. In one embodiment, the data driver 300 may be connected to the display panel 100 in a tape carrier package (TCP) manner. However, the inventive concept is not limited thereto, and the data driver 300 may be provided in the form of a plurality of driving chips and may be mounted on the display panel 100 in a chip-on-glass (COG) manner.

The data driver 300 may receive image signals and a data control signal from the timing controller. The data driver 300 may be configured to generate data voltages that are analog signals corresponding to the image signals, in response to the data control signal. The data driver 300 may provide the data voltages to the pixels PX through the data lines DL1-DLn.

The data voltages may be provided to the pixels PX through the data lines DL1-DLn, in response to the gate signals that are provided through the gate lines GL1-GLm. The pixels PX may be configured to display images with gradation levels corresponding to the data voltages.

Figure 3:
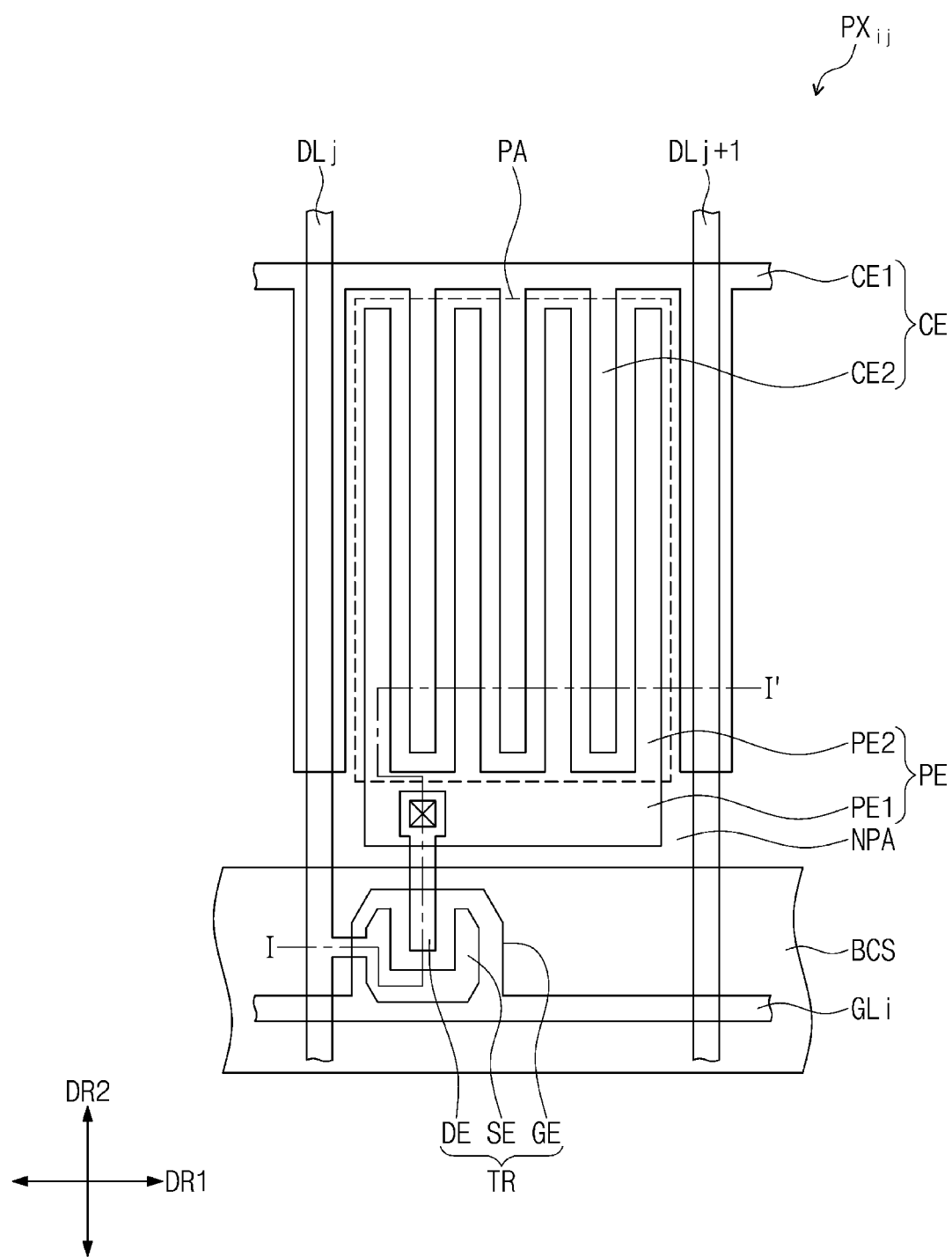
FIG. 3 is a plan view illustrating one of pixels shown in FIG. 1.

FIG. 3 is a plan view illustrating one of pixels shown in FIG. 1.

Although one pixel PXij is illustrated in FIG. 3, other pixels of FIG. 1 may be configured to have the same structure as the pixel PXij of FIG. 3.

Referring to FIG. 3, the pixel PXij may include a pixel region PA and a non-pixel region NPA that is located near or around the pixel region PA, when viewed in a plan view. The pixel region PA may correspond to a region, on which an image is displayed, and the non-pixel region NPA may correspond to a region, on which the image is not displayed.

A gate line GLi and data lines DLj and DLj+1 may be disposed in the non-pixel region NPA. The gate line GLi may extend in the first direction DR1, and the data lines DLj and DLj+1 may extend in the second direction DR2 or in a direction crossing the gate line GLi and may be electrically insulated from the gate line GLi. Here, i is an integer that is greater than 0 and is less than or equal to m, and j is an integer that is greater than 0 and is less than or equal to n.

The pixel PXij may include a transistor TR that is disposed in the non-pixel region NPA, a pixel electrode PE that is disposed in the pixel region PA and connected to the transistor TR, and a common electrode CE that is disposed in the pixel region PA and spaced apart from the pixel electrode PE. The transistor TR may be connected to the gate line GLi and the data line DLj. The transistor TR may include a gate electrode GE that is connected to the gate line GLi, a source electrode SE that is connected to the data line DLj, and a drain electrode DE that is connected to the pixel electrode PE. The gate electrode GE may correspond to a portion diverging from the gate line GLi, and the source electrode SE may correspond to a portion diverging from the data line DLj.

The pixel electrode PE and the common electrode CE may be defined as driving electrodes for driving the pixel PXij and may be spaced apart from each other on the same layer. The pixel electrode PE may include a first pixel electrode PE1 extending in the first direction DR1 and a plurality of second pixel electrodes PE2 extending from the first pixel electrode PE1 in the second direction DR2. The drain electrode DE of the transistor TR may be connected to the first pixel electrode PE1.

The common electrode CE may include a first common electrode CE1 extending in the first direction DR1 and a plurality of second common electrodes CE2 extending from the first common electrode CE1 in the second direction DR2. Although not shown, the first common electrode CE1 may be extended to the non-display region NDA of FIG. 1 and may be connected in common to the first common electrodes of other pixels PX. In the pixel region PA, the second pixel electrodes PE2 and the second common electrodes CE2 may be spaced apart from each other by a predetermined distance in the first direction DR1 and may be alternately arranged.

A blocking column spacer BCS extending in the first direction DR1 may be disposed in the non-pixel region NPA. The blocking column spacer BCS may be extended to overlap the gate line GLi. The blocking column spacer BCS may be configured to absorb light or to have a black color.

Figure 4:
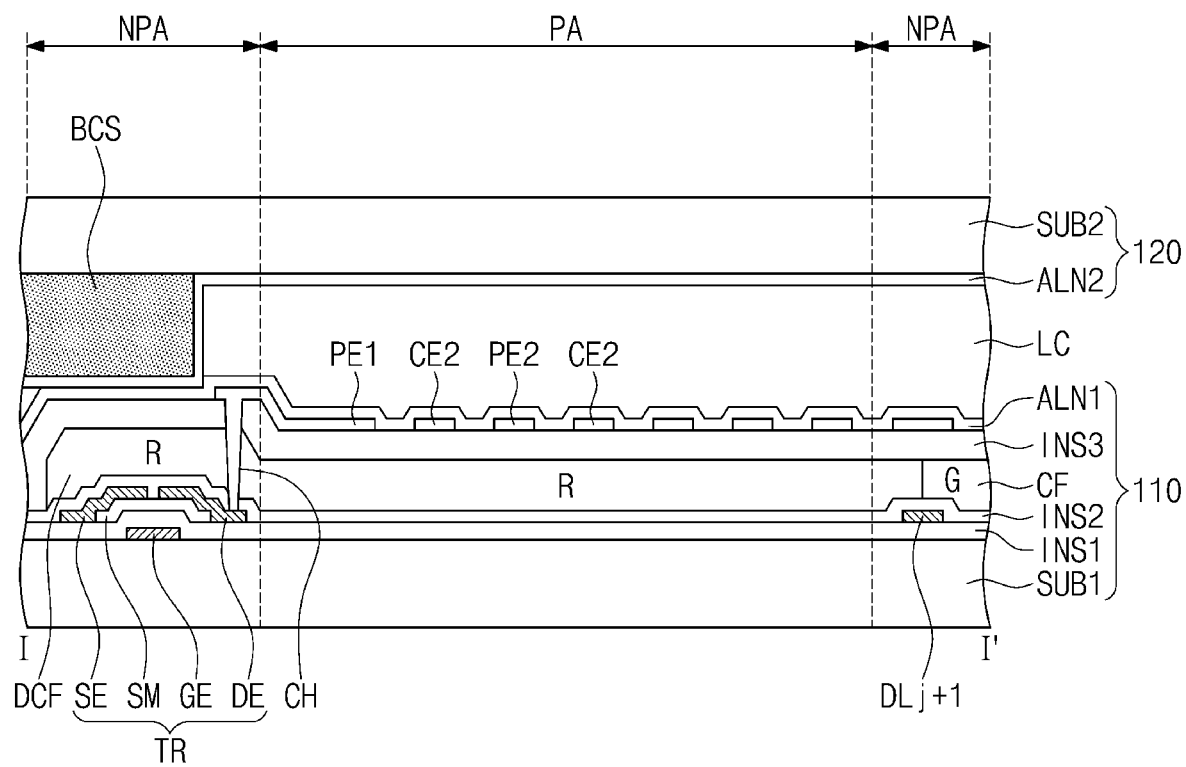
FIGS. 4 and 5 are sectional views taken along line I-I' of FIG. 3.
Figure 5:
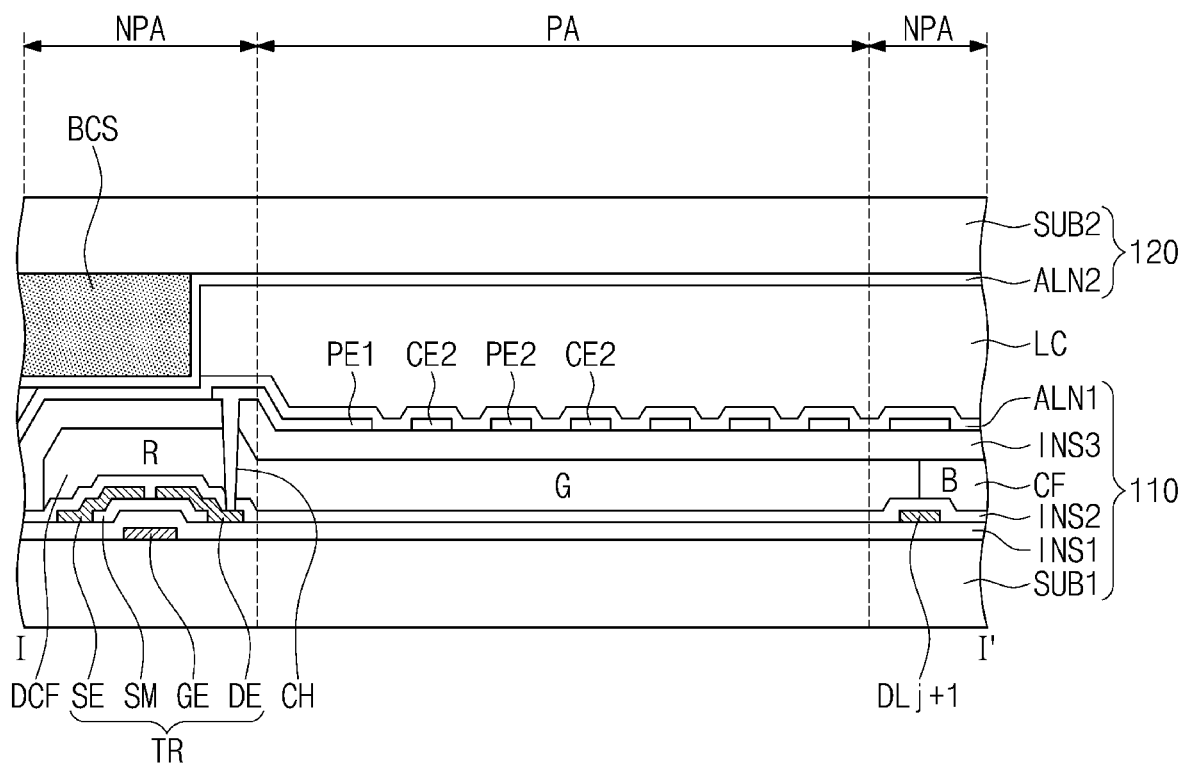

FIGS. 4 and 5 are sectional views taken along line I-I' of FIG. 3.

The pixels PX may include red, green, and blue pixels that are configured to display red, green, and blue colors, respectively. FIG. 4 illustrates a sectional view of the pixel PXij of FIG. 3 that is used as the red pixel, and FIG. 5 illustrates a sectional view of the pixel PXij of FIG. 3 that is used as the green pixel. Hereinafter, the sectional view of the pixel PXij will be described in more detail with reference to FIG. 4, and for the pixel PXij of FIG. 5, features different from those of FIG. 4 will be described.

Referring to FIG. 4, the first substrate 110 may include a first base substrate SUB1, a color filter CF, first to third insulating layers INS1-INS3, and a first alignment layer ALN1. The transistor TR, the pixel electrode PE, and the common electrode CE may be disposed in the first substrate 110. The second substrate 120 may include a second base substrate SUB2 and a second alignment layer ALN2. The blocking column spacer BCS may be disposed in the second substrate 120. The liquid crystal layer LC may be disposed between the first substrate 110 and the second substrate 120.

The first and second base substrates SUB1 and SUB2 may be transparent or opaque insulating substrates including a silicon substrate, a glass substrate, and a plastic substrate. The first base substrate SUB1 may include a plurality of the pixel regions PA and the non-pixel region NPA that is disposed near or around each of the pixel regions PA.

The gate electrode GE of the transistor TR may be disposed in the non-pixel region NPA of the first base substrate SUB1. The first insulating layer INS1 may be disposed on the first base substrate SUB1 to cover the gate electrode GE. The first insulating layer INS1 may be an inorganic insulating layer including an inorganic material and may be referred to as a gate insulating layer.

A semiconductor layer SM of the transistor TR may be disposed on the first insulating layer INS1 covering the gate electrode GE. Although not shown, the semiconductor layer SM may include an active layer and an ohmic contact layer. The semiconductor layer SM may be formed of or include at least one of amorphous silicon, poly silicon, or metal oxide semiconductor materials.

The source electrode SE and the drain electrode DE of the transistor TR may be disposed on the semiconductor layer SM and the first insulating layer INS1 adjacent to the semiconductor layer SM and may be spaced apart from each other. The semiconductor layer SM may form a conductive channel between the source electrode SE and the drain electrode DE.

A second insulating layer INS2 may be disposed on the first insulating layer INS1 to cover the transistor TR. The second insulating layer INS2 may be an inorganic insulating layer including an inorganic material and may be referred to as a passivation layer. The second insulating layer INS2 may cover a top surface of the semiconductor layer SM of the transistor TR.

In the pixel region PA, the color filter CF may be disposed on the second insulating layer INS2. In the example shown in FIG. 4, the pixel corresponding to the pixel region PA is a red pixel including a red color filter R. A green pixel may be disposed at a right side of the red pixel, and the red color filter R of the red pixel may be disposed adjacent to a green color filter G of the green pixel.

In the non-pixel region NPA, a dummy color filter DCF may be disposed on the transistor TR. The dummy color filter DCF may be disposed on the second insulating layer INS2 overlapping a region on which the transistor TR is disposed. The gate electrode GE, the semiconductor layer SM, the source electrode SE, and the drain electrode DE of the transistor TR may be disposed in the non-pixel region NPA. Thus, a first portion of the non-pixel region NPA, in which the transistor TR is disposed, may be formed at a level higher than that of a second portion of the non-pixel region NPA, in which the transistor TR is not disposed. A level or height of each element is defined as a vertical distance from a top surface of the first base substrate SUB1 in a sectional view.

The second insulating layer INS2 may be higher on the first portion of the non-pixel region NPA than on the second portion of the non-pixel region NPA. The second insulating layer INS2 may be higher on the first portion of the non-pixel region NPA than on the pixel region PA. The dummy color filter DCF is disposed on the transistor TR to be positioned at a level higher than that of the color filter CF in the pixel region PA. This may lead to a height difference between the dummy color filter DCF in the non-pixel region NPA and the color filter CF in the pixel region PA.

The dummy color filter DCF may include the red color filter R that has the same red color of the color filter CF of the pixel region PA. In this case, the dummy color filter DCF may include a portion that extends from the color filter CF of the pixel region PA adjacent to the dummy color filter DCF and is positioned on the transistor TR. However, the inventive concept is not limited thereto, and the dummy color filter DCF may include either of the green color filter G and the blue color filter B in other embodiments.

The third insulating layer INS3 may be disposed on the dummy color filter DCF and the color filter CF. The third insulating layer INS3 may be an organic insulating layer including an organic material. Owing to the height difference between the dummy color filter DCF and the color filter CF, the third insulating layer INS3 disposed on the dummy color filter DCF may be positioned at a level higher than that of the third insulating layer INS3 disposed on the color filter CF. In some embodiments, the third insulating layer INS3 may be omitted.

In the pixel region PA, the pixel electrode PE and the common electrode CE may be disposed on the third insulating layer INS3 to be spaced apart from each other. As described above, in the pixel region PA, the second pixel electrodes PE2 and the second common electrodes CE2 may be alternately arranged.

A contact hole CH may be formed to penetrate the third insulating layer INS3, the dummy color filter DCF, and the second insulating layer INS2 and to expose a region of the drain electrode DE. The drain electrode DE of the transistor TR may be electrically connected to the pixel electrode PE through the contact hole CH.

The first alignment layer ALN1 may be disposed on the third insulating layer INS3. The first alignment layer ALN1 may be disposed on the third insulating layer INS3 to substantially cover the pixel electrode PE and the common electrode CE. In the case where the third insulating layer INS3 is omitted, the first alignment layer ALN1 may be disposed on the dummy color filter DCF and the color filter CF to cover the pixel electrode PE and the common electrode CE.

In the non-pixel region NPA, the blocking column spacer BCS may be disposed below the second base substrate SUB2. When viewed in a top plan view, the blocking column spacer BCS may be disposed in the non-pixel region NPA to be adjacent to a side surface of the pixel electrode PE. The second alignment layer ALN2 may be disposed below the blocking column spacer BCS and the second base substrate SUB2. The second alignment layer ALN2 may be disposed on a bottom surface of the second base substrate SUB2 to cover the blocking column spacer BCS.

The blocking column spacer BCS may be used to maintain a cell gap between the first substrate 110 and the second substrate 120, and the dummy color filter DCF may be used to support the blocking column spacer BCS. In detail, the dummy color filter DCF may be disposed at a level higher than that of the color filter CF, and thus, the third insulating layer INS3 disposed on the dummy color filter DCF may also be disposed at a level higher than that of the third insulating layer INS3 around the dummy color filter DCF. The blocking column spacer BCS may be formed to have a size to allow the first alignment layer ALN1 on the dummy color filter DCF and the second alignment layer ALN2 below the blocking column spacer BCS to be in contact with each other, when the first substrate 110 and the second substrate 120 are bonded to each other.

The dummy color filter DCF may be disposed on the transistor TR overlapping the blocking column spacer BCS, and in this case, it may be possible to form the dummy color filter DCF capable of supporting the blocking column spacer BCS.

The transistor TR may be turned on by a gate signal that is transmitted through the gate line GLi. The turned-on transistor TR may provide a data voltage that is transmitted through the data line DLj to the pixel electrode PE. A common voltage may be applied to the common electrode CE. In the case where there is a voltage difference between the data voltage and the common voltage, a horizontal electric field may be produced between the pixel electrode PE and the common electrode CE that may be used to drive the liquid crystal layer LC. For example, the horizontal electric field may be used to change a motion or an orientation of liquid crystal molecules of the liquid crystal layer LC and thereby to control optical transmittance of the liquid crystal layer LC and to display an image accordingly.

As shown in FIGS. 3 and 4, the pixel electrode PE and the common electrode CE may be configured to realize an in-plane switching (IPS) mode. Although configuration for the IPS mode is exemplarily illustrated, the inventive concept is not limited thereto. For example, various modes, such as a plane-to-line switching (PLS) mode, a fringe field switching (FFS) mode, and a vertical alignment (VA) mode, may be used for the display device 500.

Referring to FIG. 4, the dummy color filter DCF may be disposed adjacent to the red color filter R of the red pixel. However, the inventive concept is not limited thereto. For example, as shown in FIG. 5, the dummy color filter DCF may be disposed adjacent to the green color filter G of the green pixel.

Referring to FIG. 5, the green color filter G may be disposed in the pixel region PA, and the dummy color filter DCF including the red color filter R may be disposed on the transistor TR in the non-pixel region NPA. In other words, the dummy color filter DCF may have a different color from that of the color filter CF that is disposed in the pixel region PA adjacent to the dummy color filter DCF. In this case, the dummy color filter DCF may not be extended from the green color filter G and may be additionally formed on the transistor TR in the non-pixel region NPA separate from the green color filter G.

Although not shown, the dummy color filter DCF may be disposed adjacent to the blue color filter B of the blue pixel in other embodiments.

Figure 6:
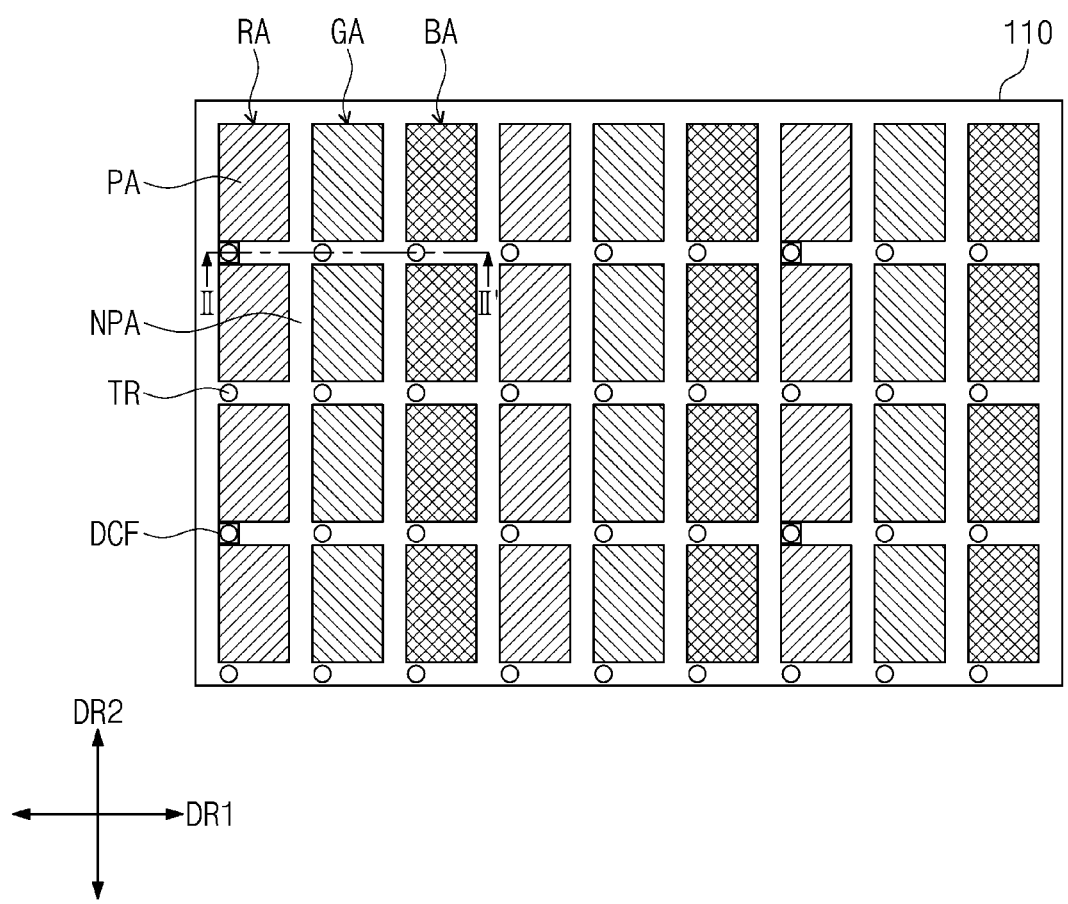
FIG. 6 is a plan view illustrating a planar arrangement of a plurality of pixel regions on a first substrate according to some embodiments of the inventive concept.
Figure 7:
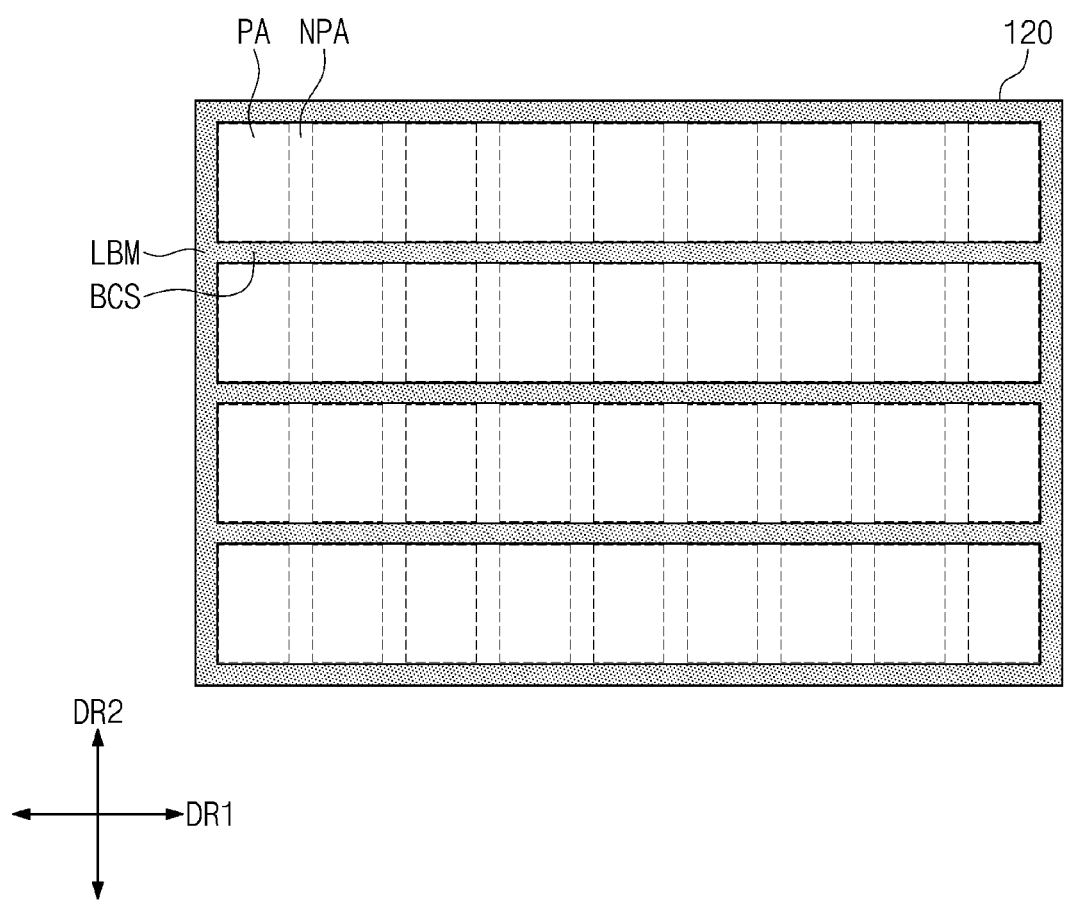
FIG. 7 is a plan view illustrating a planar arrangement of a blocking column spacer on a second substrate according to some embodiments of the inventive concept.

FIG. 6 is a plan view illustrating a planar arrangement of a plurality of pixel regions on a first substrate according to some embodiments of the inventive concept. FIG. 7 is a plan view illustrating a planar arrangement of a blocking column spacer on a second substrate according to some embodiments of the inventive concept.

FIG. 6 illustrates an example of the planar arrangement of the plurality of pixel regions including 9×4 (i.e., 36) pixel regions PA, however, the inventive concept is not limited thereto. For example, the number of the pixel regions PA disposed in the first substrate 110 may be larger than that shown in FIG. 6.

Referring to FIGS. 6 and 7, the pixel regions PA may be arranged to form a plurality of rows parallel to the first direction DR1 and a plurality of columns parallel to the second direction DR2. The pixel regions PA may include a plurality of red pixel regions RA configured to emit red light, a plurality of green pixel regions GA configured to emit green light, and a plurality of blue pixel regions BA configured to emit blue light. The red color filter R may be disposed in each of the red pixel regions RA, the green color filter G may be disposed in each of the green pixel regions GA, and the blue color filter B may be disposed in each of the blue pixel regions BA.

The transistors TR may be disposed in the non-pixel region NPA between the pixel regions PA that are adjacent to each other in the second direction DR2. Each of the dummy color filters DCF may have a single-layered structure and disposed on predetermined ones of the transistors TR, and the number of the dummy color filters DCF may be less than that of the transistors TR. In other words, the dummy color filters DCF may be respectively disposed on a predetermined number of ones of the transistors TR. Accordingly, each of the dummy color filters DCF may be disposed on a corresponding one of the predetermined number of the transistors TR.

The dummy color filters DCF may be disposed to correspond to a predetermined number of ones of the red color filters R. In the case where each of the dummy color filters DCF includes the red color filter R, the dummy color filters DCF may extend from respective ones of the red color filters R and may be disposed on respective ones of the transistors TR.

In the non-pixel region NPA between the pixel regions PA that are adjacent to each other in the second direction DR2, a plurality of the blocking column spacers BCS extending in the first direction DR1 may be disposed below the second base substrate SUB2. The blocking column spacers BCS may be connected to a light-blocking member LBM that is disposed along a border of the second substrate 120 and has a rectangular band shape. A region disposed with the light-blocking member LBM may correspond substantially to the non-display region NDA of FIG. 1.

The blocking column spacers BCS and the light-blocking member LBM may be connected to each other, thereby forming a single body. The number of the blocking column spacers BCS extending in the first direction DR1 may be two or more. However, since the blocking column spacers BCS are connected to the light-blocking member LBM to form the single body, the blocking column spacers BCS and the light-blocking member LBM may be referred to as a single element.

Figure 8:
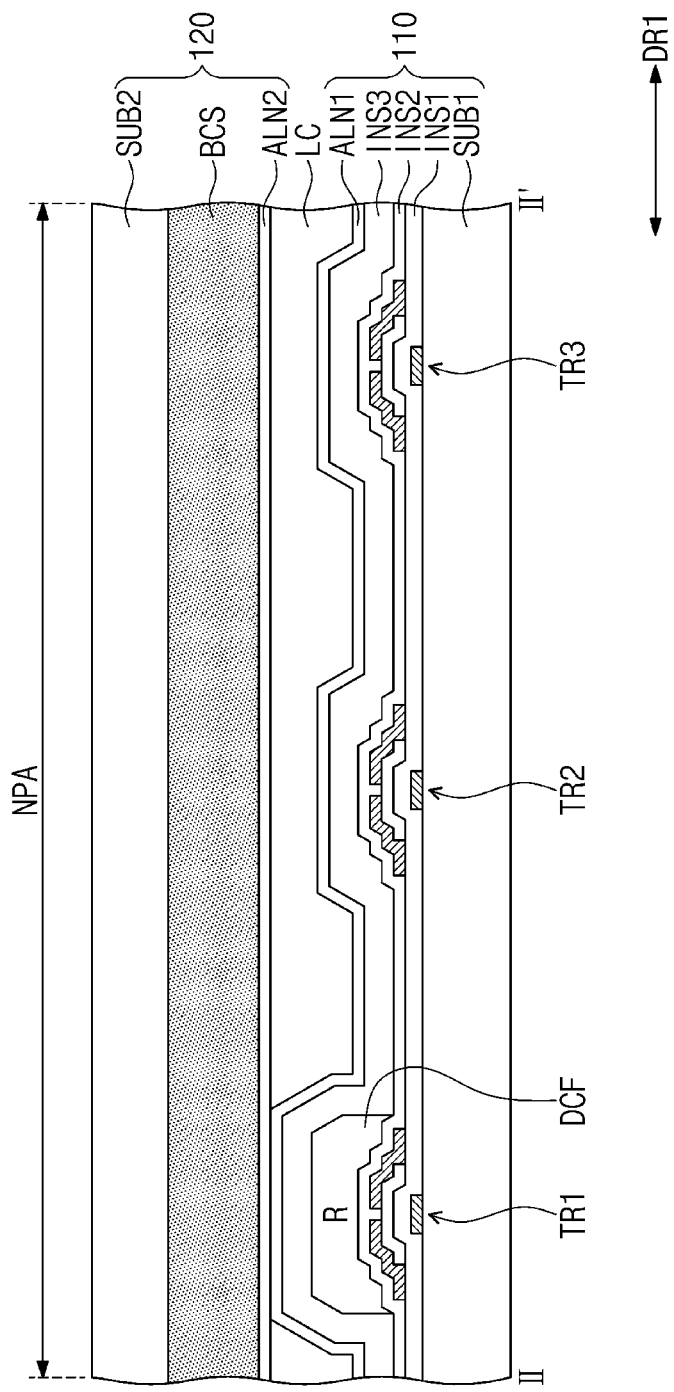
FIG. 8 is a sectional view taken along line II-II' of FIG. 6.

FIG. 8 is a sectional view taken along line II-II' of FIG. 6.

For convenience in illustration, FIG. 8 illustrates not only the sectional view of the first substrate 110 taken along line II-II' of FIG. 6 but also the sectional view of the second substrate 120 of FIG. 7 corresponding to the line II-II'.

Referring to FIG. 8, the transistor TR disposed adjacent to the red pixel region RA will be referred to as a first transistor TR1, the transistor TR disposed adjacent to the green pixel region GA will be referred to as a second transistor TR2, and the transistor TR disposed adjacent to the blue pixel region BA will be referred to as a third transistor TR3.

The first transistor TR1 may be a transistor for driving a red pixel RA that includes the red color filter R, the second transistor TR2 may be a transistor for driving a green pixel GA that includes the green color filter G, and the third transistor TR3 may be a transistor for driving a blue pixel BA that includes the blue color filter B.

The dummy color filter DCF may be disposed on the first transistor TR1. The dummy color filter DCF may not be disposed on adjacent transistors TR, for example, the second transistor TR2 and the third transistor TR3, in the non-pixel region NPA. In other words, the dummy color filters DCF may be respectively disposed on a predetermined number of the transistors TR but may not be disposed in the non-pixel region NPA near each of the predetermined number of the transistors TR.

The third insulating layer INS3 may be disposed on the second insulating layer INS2 to cover the dummy color filters DCF. The first alignment layer ALN1 may be disposed on the third insulating layer INS3, and the second alignment layer ALN2 may be disposed below the blocking column spacer BCS. In the non-pixel region NPA, a height of the third insulating layer INS3 may be higher on the dummy color filters DCF than near the dummy color filters DCF.

The blocking column spacer BCS may extend in the first direction DR1 without a substantial change in its height or thickness. The first alignment layer ALN1 on the dummy color filter DCF and the second alignment layer ALN2 below the blocking column spacer BCS may be disposed to be in contact with each other. Since the blocking column spacer BCS is supported by the dummy color filter DCF, a cell gap between the first substrate 110 and the second substrate 120 may be maintained.

A conventional display device includes main column spacers and sub column spacers having different sizes to maintain the cell gap between the first substrate 110 and the second substrate 120. The main column spacers may be disposed below the second substrate 120 to be in contact with the first substrate 110 and to maintain a cell gap between the first substrate 110 and the second substrate 120, and the sub column spacers may be disposed below the second substrate 120 to be spaced apart from the first substrate 110 by a predetermined distance.

To realize a difference in heights between the main column spacers and the sub column spacers, a halftone mask may be used. For example, the formation of the main and sub column spacers with different sizes (i.e., heights) may include forming a photoresist layer on the second substrate 120 and then removing a predetermined region of the photoresist layer using a halftone mask. However, since the halftone mask is more difficult to manufacture, and more expensive than a full-tone mask, the use of the halftone mask may lead to inconvenience in the fabrication process and an increase in fabrication cost.

According to some embodiments of the inventive concept, since the blocking column spacer BCS extending in a direction and having the same size is used, it may be unnecessary to use the halftone mask. Since the dummy color filters DCF are disposed on a predetermined number of the transistors TR to support the blocking column spacer BCS, portions of the blocking column spacer BCS overlapped with the dummy color filters DCF may be used as substantially the main column spacers. The cell gap between the first substrate 110 and the second substrate 120 may be maintained by the dummy color filters DCF and the blocking column spacer BCS, and thus, it may be unnecessary to use the main and sub column spacers with different sizes.

In the display device 500 according to some embodiments of the inventive concept, there is no need for the main and sub column spacers with different sizes, and thus, it may be unnecessary to use the halftone mask. Accordingly, it may be possible to improve convenience in a fabrication process and to reduce a fabrication cost.

FIGS. 9 to 12 are sectional views illustrating sub-dummy color filters and dummy color filters in display devices according to some embodiments of the inventive concept.

For convenience in illustration, in FIGS. 9 to 12, sectional views corresponding to that of FIG. 8 are illustrated, and the first to third transistors TR1, TR2, and TR3 are identified by the same reference letter of TR without distinction therebetween.

Hereinafter, the structures of sub-dummy color filters SDCF and dummy color filters DCF1 and DCF2 according to some embodiments of the inventive concept will be described with reference to FIGS. 9 to 12. With regard to the sub-dummy color filter SDCF and the dummy color filters DCF1 and DCF2 shown in FIGS. 9 to 12, different features from the dummy color filter DCF shown in FIG. 8 will be mainly described below, and other features may be substantially the same as those of FIG. 8.

Figure 9:
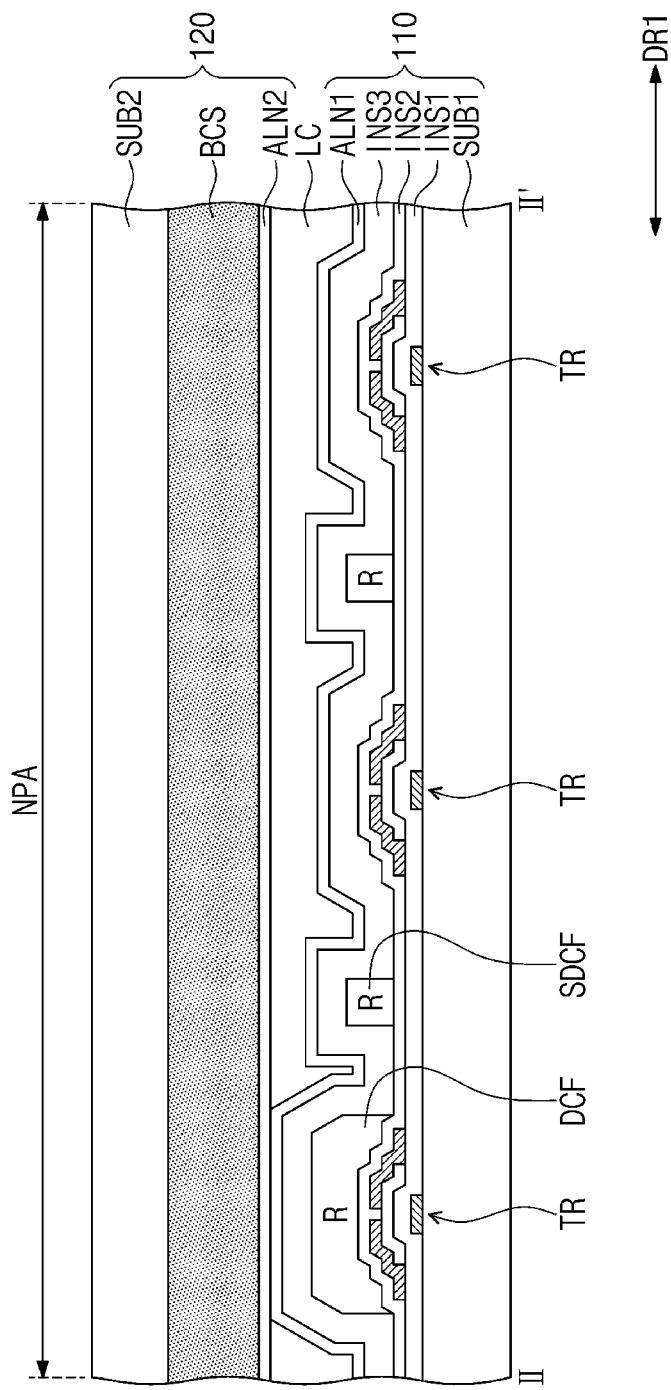
FIGS. 9 to 12 are sectional views illustrating sub-dummy color filters and dummy color filters in display devices according to some embodiments of the inventive concept.

Referring to FIG. 9, a display device may include the dummy color filters DCF that are respectively disposed on a predetermined number of ones of the transistors TR, and a plurality of the sub-dummy color filters SDCF that is disposed in the non-pixel region NPA between the transistors TR and on the second insulating layer INS2. The sub-dummy color filters SDCF may be disposed overlapping the blocking column spacer BCS, and the third insulating layer INS3 may be disposed on the second insulating layer INS2 to cover the sub-dummy color filters SDCF. The first alignment layer ALN1 may be disposed on the third insulating layer INS3, and the second alignment layer ALN2 may be disposed below the blocking column spacer BCS.

The sub-dummy color filters SDCF may include the same color filters as the dummy color filters DCF. For example, each of the dummy color filters DCF and the sub-dummy color filters SDCF may include the red color filter R. However, the inventive concept is not limited thereto, and the sub-dummy color filters SDCF may include different color filters from the dummy color filters DCF. For example, each of the dummy color filters DCF may include the red color filter R, and each of the sub-dummy color filters SDCF may include either of the green color filter G and the blue color filter B.

The sub-dummy color filters SDCF may be disposed to be spaced apart from the dummy color filters DCF. The sub-dummy color filters SDCF may be solely disposed in the non-pixel region NPA between an adjacent pair of the transistors TR.

The sub-dummy color filters SDCF may be disposed in a portion of the non-pixel region NPA, in which the transistors TR are not disposed. Each of the dummy color filters DCF may be positioned at a level higher than that of each of the sub-dummy color filters SDCF. Except for the above differences, the display device shown in FIG. 9 may be configured to have substantially the same features as those in FIG. 8, and thus, further description thereof will be omitted, for brevity's sake.

Figure 10:
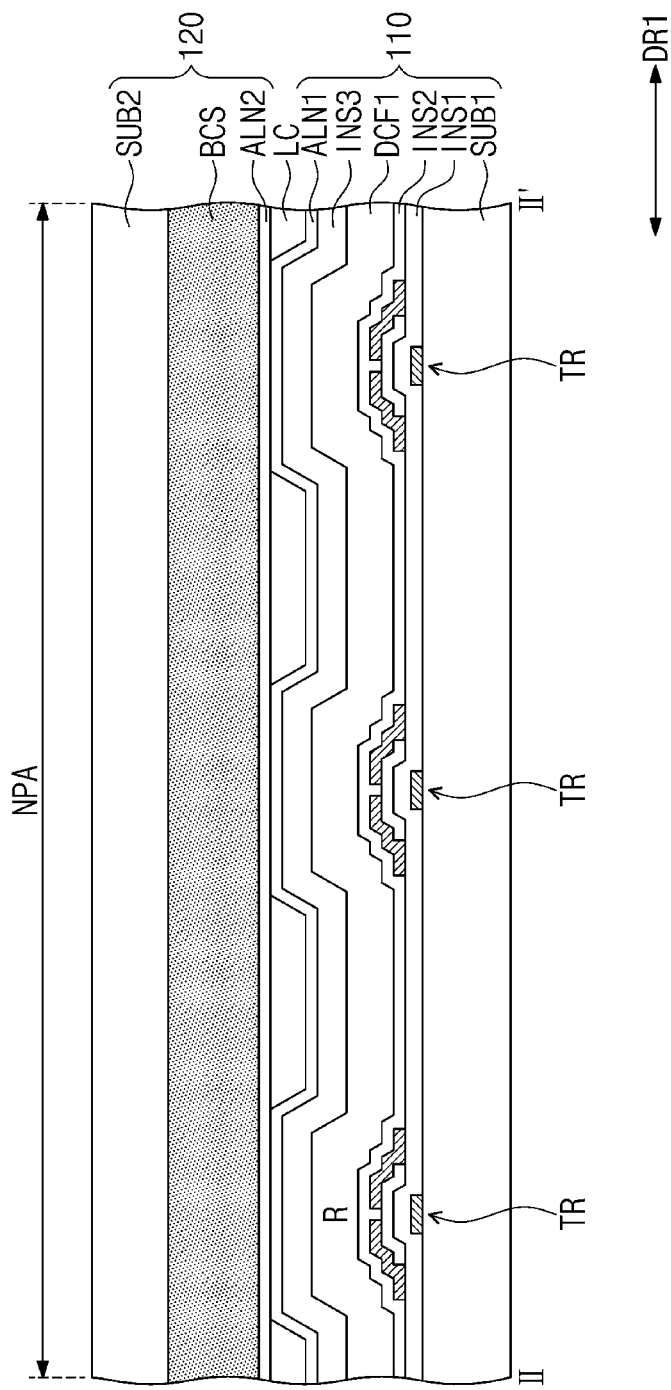

Referring to FIG. 10, in the non-pixel region NPA between the pixel regions PA adjacent to each other in the second direction DR2, the dummy color filter DCF1 may extend in the first direction DR1 in a similar manner as the blocking column spacer BCS. The dummy color filter DCF1 may be overlapped with the blocking column spacer BCS and may be disposed on the second insulating layer INS2 to cover the transistors TR. Since FIG. 10 is a sectional view, one of the dummy color filters DCF1 is illustrated in FIG. 10. However, when viewed in a plan view, a plurality of the dummy color filters DCF1 extending in the first direction DR1 may be disposed on the first base substrate SUB1 in a similar manner as a plurality of the blocking column spacer BCS shown in FIG. 7.

A portion of the dummy color filters DCF1 disposed on the transistors TR may be positioned at a level higher than other portions of the dummy color filters DCF1 disposed between the adjacent transistors TR. The third insulating layer INS3 may be disposed on the dummy color filter DCF1. The first alignment layer ALN1 may be disposed on the third insulating layer INS3, and the second alignment layer ALN2 may be disposed below the blocking column spacer BCS. The portion of the dummy color filters DCF1 overlapped with the transistors TR may be configured to support the blocking column spacer BCS.

Except for the above described differences, the display device shown in FIG. 10 may be configured to have substantially the same features as those in FIG. 8, and thus, further description thereof will be omitted, for brevity's sake.

Figure 11:
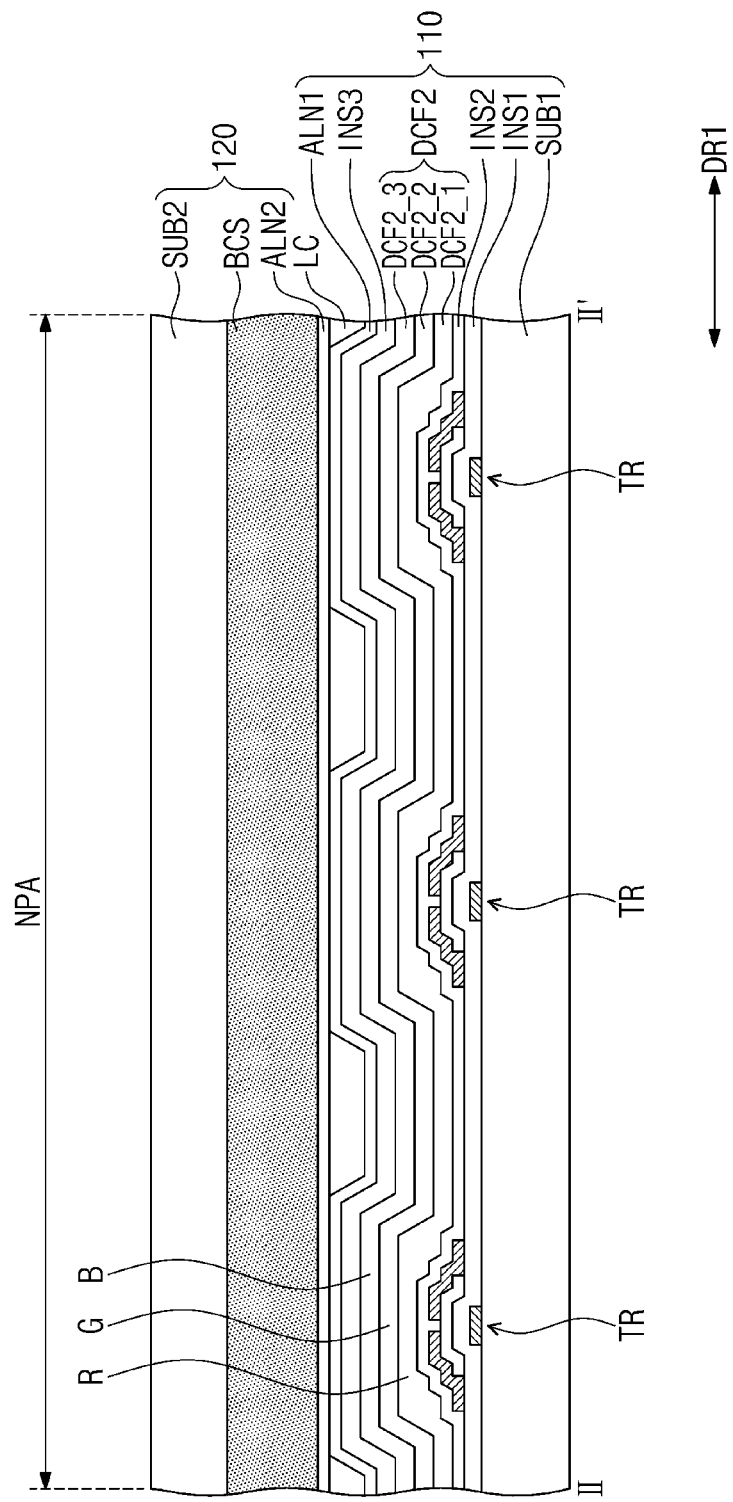

Referring to FIG. 11, in the non-pixel region NPA between the pixel regions PA adjacent to each other in the second direction DR2, the dummy color filter DCF2 may extend in the first direction DR1, thereby being overlapped with the blocking column spacer BCS. The dummy color filter DCF2 may be overlapped with the blocking column spacer BCS and may be disposed on the second insulating layer INS2 to cover the transistors TR. Similar to the dummy color filters DCF1 described with reference to FIG. 10, a plurality of the dummy color filters DCF2 extending in the first direction DR1 may be disposed on the first base substrate SUB1, when viewed in a plan view.

The dummy color filter DCF2 may include a first dummy color filter DCF2_1 that is disposed on the second insulating layer INS2, a second dummy color filter DCF2_2 that is disposed on the first dummy color filter DCF2_1, and a third dummy color filter DCF2_3 that is disposed on the second dummy color filter DCF2_2. The third insulating layer INS3 may be disposed on the third dummy color filter DCF2_3. The first alignment layer ALN1 may be disposed on the third insulating layer INS3, and the second alignment layer ALN2 may be disposed below the blocking column spacer BCS.

The first dummy color filter DCF2_1 may include the red color filter R, the second dummy color filter DCF2_2 may include the green color filter G, and the third dummy color filter DCF2_3 may include the blue color filter B. In general, when red, green, and blue lights are mixed, they become white light. By contrast, in the case where different colors, not lights, are mixed, the resulting color may become dark. For example, in the case where red, green, blue colors are mixed, the resulting color may be close to black. Accordingly, the dummy color filter DCF2 that includes the red color filter R, the green color filter G, and the blue color filter B may be used as a light block layer, similar to the blocking column spacer BCS.

Except for the above described differences, the display device shown in FIG. 11 may be configured to have substantially the same features as those in FIG. 10, and thus, further description thereof will be omitted, for brevity's sake.

Figure 12:
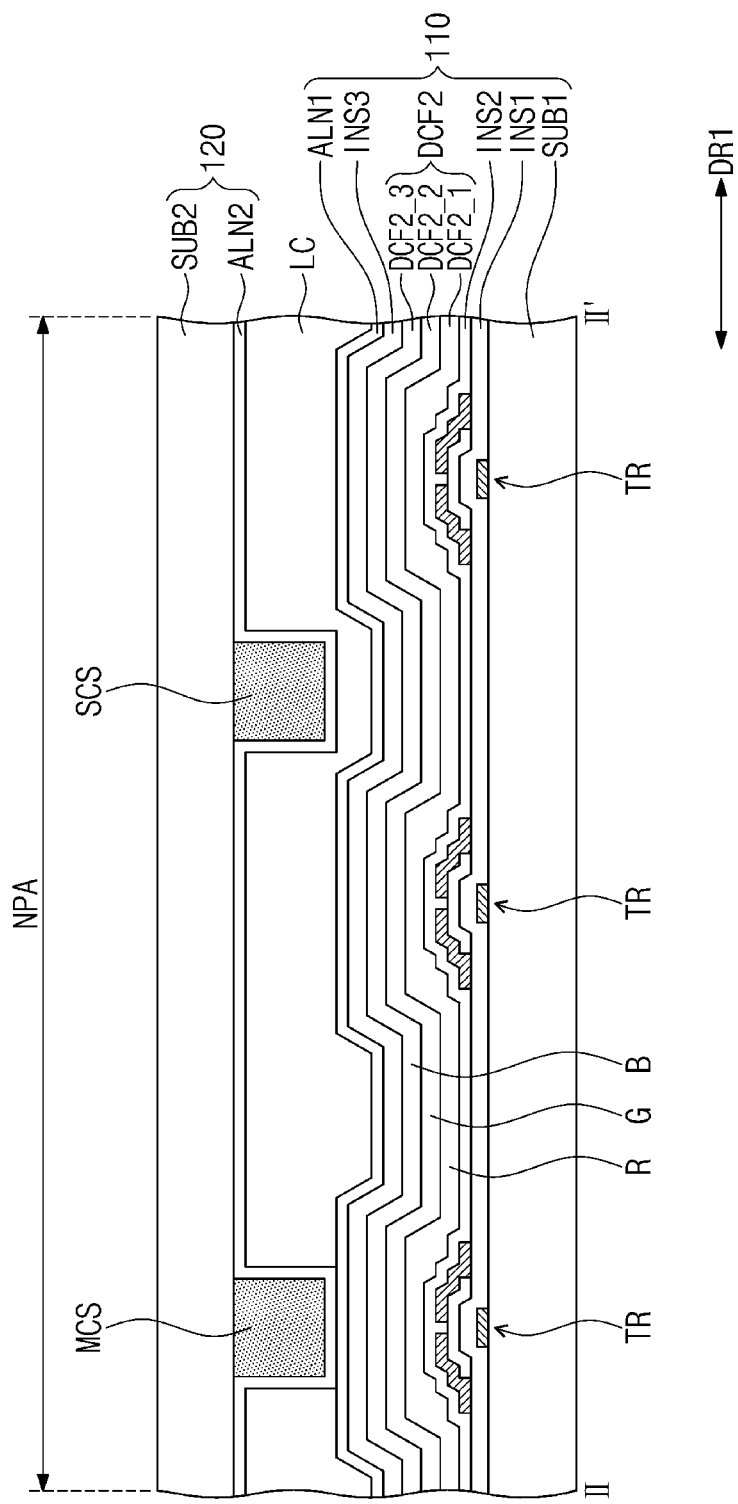

Referring to FIG. 12, the dummy color filter DCF2 may be configured to have substantially the same features as those of the dummy color filter DCF2 shown in FIG. 11, except for the following differences. A plurality of main and sub column spacers MCS and SCS, not the blocking column spacer BCS, may be disposed below the second base substrate SUB2. For example, one main column spacer MCS and one sub column spacer SCS are exemplarily illustrated in FIG. 12, however, a plurality of main column spacers MCS and a plurality of sub column spacers SCS may be disposed below the second base substrate SUB2.

The main and sub column spacers MCS and SCS may have substantially the same size. The second alignment layer ALN2 may be disposed below the second base substrate SUB2 to cover the main and sub column spacers MCS and SCS.

As shown in FIG. 12, no blocking column spacer BCS may be disposed below the second base substrate SUB2. In this embodiment, the dummy color filter DCF2 may be configured to serve as a light blocking layer or to provide the same function as that of the blocking column spacer BCS.

The main column spacers MCS may be disposed to be respectively overlapped with a predetermined number of ones of the transistors TR. The sub column spacers SCS may be disposed between the main column spacers MCS in the non-pixel region NPA.

A portion of the dummy color filter DCF2 overlapped with the transistor TR may be used to support the main column spacer MCS. In other words, portions of the dummy color filter DCF2 positioned on the predetermined number of the transistors TR may be used to support the main column spacers MCS.

Except for the above described differences, the display device shown in FIG. 12 may be configured to have substantially the same features as those in FIG. 11, and thus, further description thereof will be omitted, for brevity's sake.

According to some embodiments of the inventive concept, blocking column spacers having the same size and extending in a direction or main and sub column spacers with the same size may be disposed on a second substrate. Dummy color filters disposed on a first substrate may be used to support the blocking column spacers or to support the main column spacers of the main and sub column spacers. Accordingly, it is unnecessary to use a halftone mask for realizing a difference in size between the main column spacers and the sub column spacers, and thus, it may be possible to improve convenience in a fabrication process and to reduce a fabrication cost.

While example embodiments of the inventive concepts have been particularly shown and described, it will be understood by one of ordinary skill in the art that variations in form and detail may be made therein without departing from the spirit and scope of the present disclosure.

What is claimed is:

1. A display device comprising:
a first base substrate including a plurality of pixel regions that is arranged to form a plurality of rows and a plurality of columns, and a non-pixel region that is disposed adjacent to each of the pixel regions, the rows being parallel to a first direction and the columns being parallel to a second direction crossing the first direction;
a second base substrate facing the first base substrate;
a liquid crystal layer disposed between the first base substrate and the second base substrate;
a plurality of color filters disposed on the first base substrate in the plurality of pixel regions;
a plurality of driving electrodes disposed on the plurality of color filters;
a plurality of transistors disposed on the first base substrate in the non-pixel region between adjacent pixel regions in the second direction and connected to the plurality of driving electrodes, respectively;
a plurality of blocking column spacers disposed below the second base substrate and extending in the first direction in the non-pixel region between the adjacent pixel regions in the second direction; and
a plurality of dummy color filters that is disposed in a single-layered structure on predetermined ones of the plurality of transistors, and a number of the plurality of dummy color filters is less than a number of the plurality of transistors,
wherein the plurality of dummy color filters supports the plurality of blocking column spacers.

2. The display device of claim 1, wherein each of the plurality of dummy color filters is positioned at a level higher than that of each of the plurality of color filters from the first base substrate in a sectional view.

3. The display device of claim 1, wherein each of the dummy color filters comprises one of red, green, and blue color filters, and the plurality of blocking column spacers are black.

4. The display device of claim 1, further comprising:
an insulating layer disposed on the first base substrate and covering the plurality of color filters and the plurality of dummy color filters;
a first alignment layer disposed on the insulating layer; and a second alignment layer disposed below the second base substrate and covering the plurality of blocking column spacers,
wherein the plurality of driving electrodes is disposed on the insulating layer,
the first alignment layer is disposed on the insulating layer and covers the plurality of driving electrodes, and
the first alignment layer that is disposed on the plurality of dummy color filters and the second alignment layer that is disposed below the plurality of blocking column spacers are in contact with each other.

5. The display device of claim 4, wherein a first portion of the insulating layer that is disposed on the plurality of dummy color filters is positioned at a level higher than a second portion of the insulating layer near each of the plurality of dummy color filters.

6. The display device of claim 1, wherein the plurality of driving electrodes comprises:
a plurality of pixel electrodes connected to the transistors; and
a common electrode spaced apart from the plurality of pixel electrodes and disposed on a same layer as the plurality of pixel electrodes.

7. The display device of claim 6, wherein each of the pixel electrodes comprises:
a first pixel electrode extending in the first direction; and
a plurality of second pixel electrodes extending from the first pixel electrode in the second direction,
wherein the common electrode comprises:
a first common electrode extending in the first direction; and
a plurality of second common electrodes extending from the first common electrode in the second direction,
wherein the plurality of second pixel electrodes and the plurality of second common electrodes are arranged to be spaced apart from each other in the first direction by a predetermined distance in the pixel region.

8. The display device of claim 1, wherein each of the plurality of dummy color filters comprises a red color filter.

9. The display device of claim 8, wherein the plurality of color filters comprises a plurality of red color filters, a plurality of green color filters, and a plurality of blue color filters, and
the plurality of dummy color filters is arranged adjacent to a predetermined number of ones of the plurality of red color filters,
wherein the plurality of dummy color filters is respectively extended from the predetermined number of the plurality of red color filters.

10. The display device of claim 1, wherein the first and second base substrates are curved about an axis extending in the second direction.

11. The display device of claim 1, further comprising a plurality of sub-dummy color filters that is disposed on the first base substrate in the non-pixel region between adjacent transistors overlapping the plurality of blocking column spacers.

12. The display device of claim 11, wherein the plurality of sub-dummy color filters is spaced apart from the plurality of dummy color filters.

13. The display device of claim 11, wherein each of the plurality of dummy color filters is positioned at a level higher than that of the plurality of sub-dummy color filters from the first base substrate in a sectional view.

14. A display device comprising:
a first base substrate including a plurality of pixel regions that is arranged to form a plurality of rows and a plurality of columns, and a non-pixel region that is disposed adjacent to each of the pixel regions, the rows being parallel to a first direction and the columns being parallel to a second direction crossing the first direction;

a second base substrate facing the first base substrate;

a liquid crystal layer disposed between the first base substrate and the second base substrate;

a plurality of color filters disposed on the first base substrate in the plurality of pixel regions;

a plurality of driving electrodes disposed on the plurality of color filters;

a plurality of transistors disposed on the first base substrate in the non-pixel region between adjacent pixel regions in the second direction and connected to the plurality of driving electrodes, respectively;

a plurality of blocking column spacers disposed below the second base substrate and extending in the first direction in the non-pixel region between the adjacent pixel regions in the second direction; and a plurality of dummy color filters extending in the first direction overlapping the plurality of blocking column spacers and disposed on the first base substrate to cover the plurality of transistors, wherein some of the plurality of dummy color filters disposed on the plurality of transistors support the plurality of blocking column spacers, and wherein the plurality of dummy color filters disposed on predetermined ones of the plurality of transistors are positioned at a level higher than that of the plurality of dummy color filters that is disposed adjacent to the predetermined ones of the plurality of transistors.

15. The display device of claim 14, wherein each of the plurality of dummy color filters comprises one of red, green, and blue color filters, and the plurality of blocking column spacers are black.

16. The display device of claim 14, wherein each of the dummy color filters comprises:
 a first dummy color filter including a red color filter;
 a second dummy color filter disposed on the first dummy color filter, the second dummy color filter including a green color filter; and
 a third dummy color filter disposed on the second dummy color filter, the third dummy color filter including a blue color filter.

17. A display device comprising:
a first base substrate including a plurality of pixel regions that is arranged to form a plurality of rows and a plurality of columns, and a non-pixel region that is disposed near each of the pixel regions, the rows being parallel to a first direction and the columns being parallel to a second direction crossing the first direction;

a second base substrate facing the first base substrate;

a liquid crystal layer disposed between the first base substrate and the second base substrate;

a plurality of color filters disposed on the first base substrate in the plurality of pixel regions;

a plurality of driving electrodes disposed on the plurality of color filters;

a plurality of transistors disposed on the first base substrate in the non-pixel region between adjacent pixel regions in the second direction and connected to the plurality of driving electrodes, respectively;

a plurality of main column spacers disposed below the second base substrate and overlapping a predetermined number of ones of the plurality of transistors;

a plurality of sub column spacers disposed adjacent to the plurality of main column spacers; and a plurality of dummy color filters disposed on the non-pixel region of the first base substrate that is positioned between the adjacent pixel regions in the second direction, the plurality of dummy color filters extending in the first direction and covering the plurality of transistors, wherein ones of the plurality of dummy color filters that is disposed on the predetermined number of ones of the plurality of transistors is used to support the plurality of main column spacers, and wherein the plurality of main column spacers and the plurality of sub column spacers have a same size.

18. The display device of claim 17, wherein the plurality of dummy color filters comprises:
 a first dummy color filter including a red color filter;
 a second dummy color filter disposed on the first dummy color filter, the second dummy color filter including a green color filter; and
 a third dummy color filter disposed on the second dummy color filter, the third dummy color filter including a blue color filter.

* * * * *